United States Patent Office 2,762,250
Patented Sept. 11, 1956

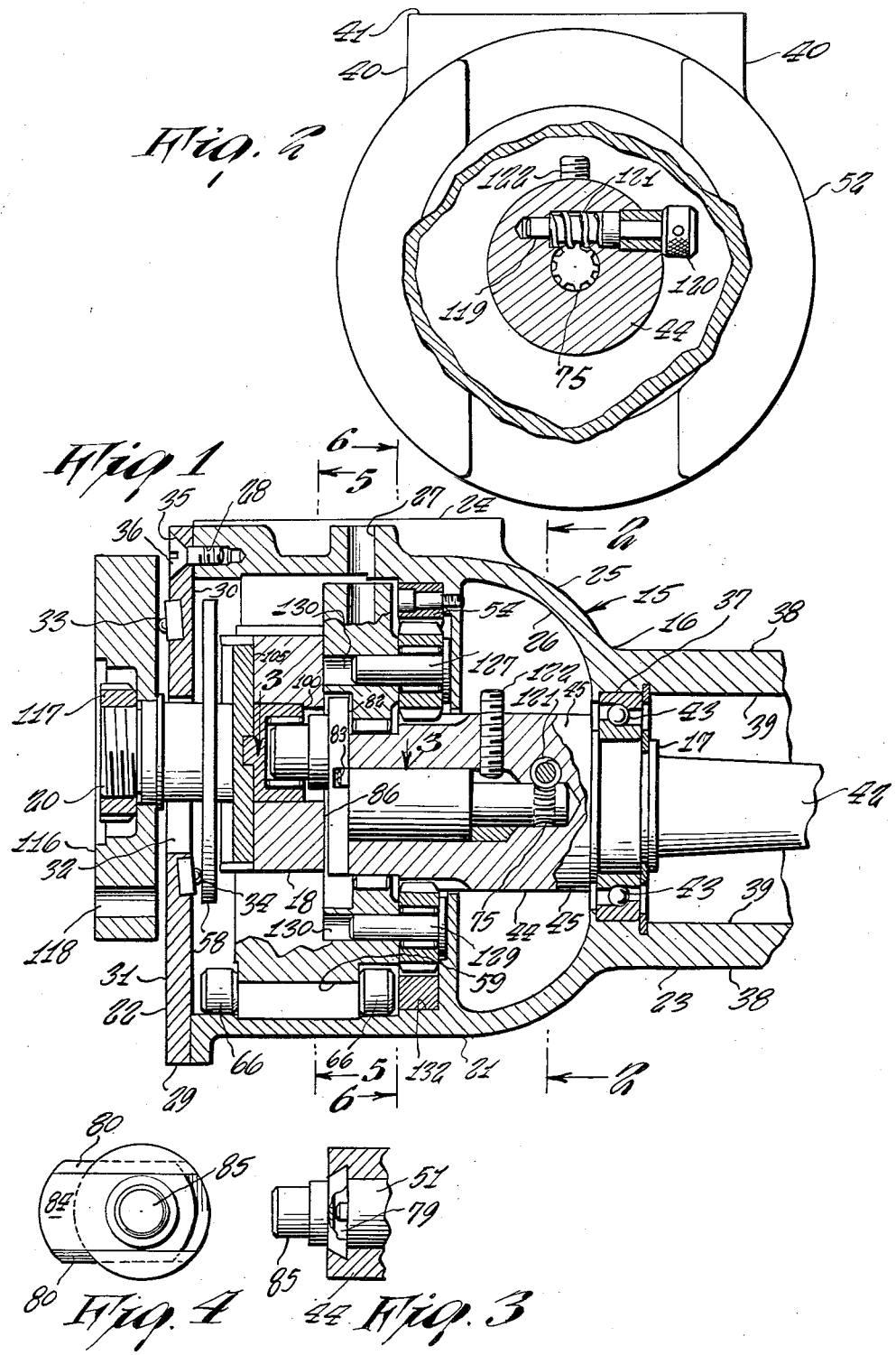

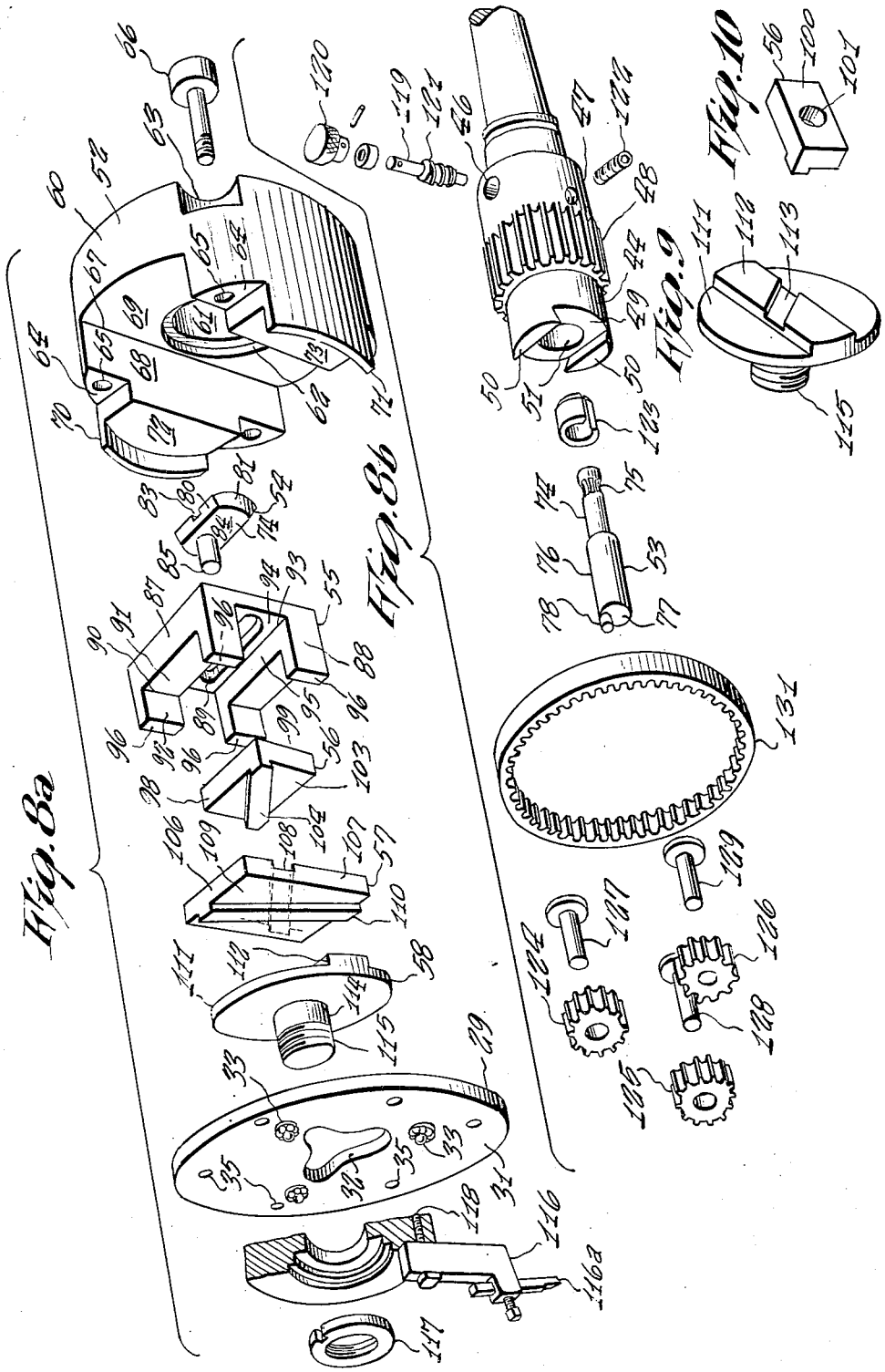

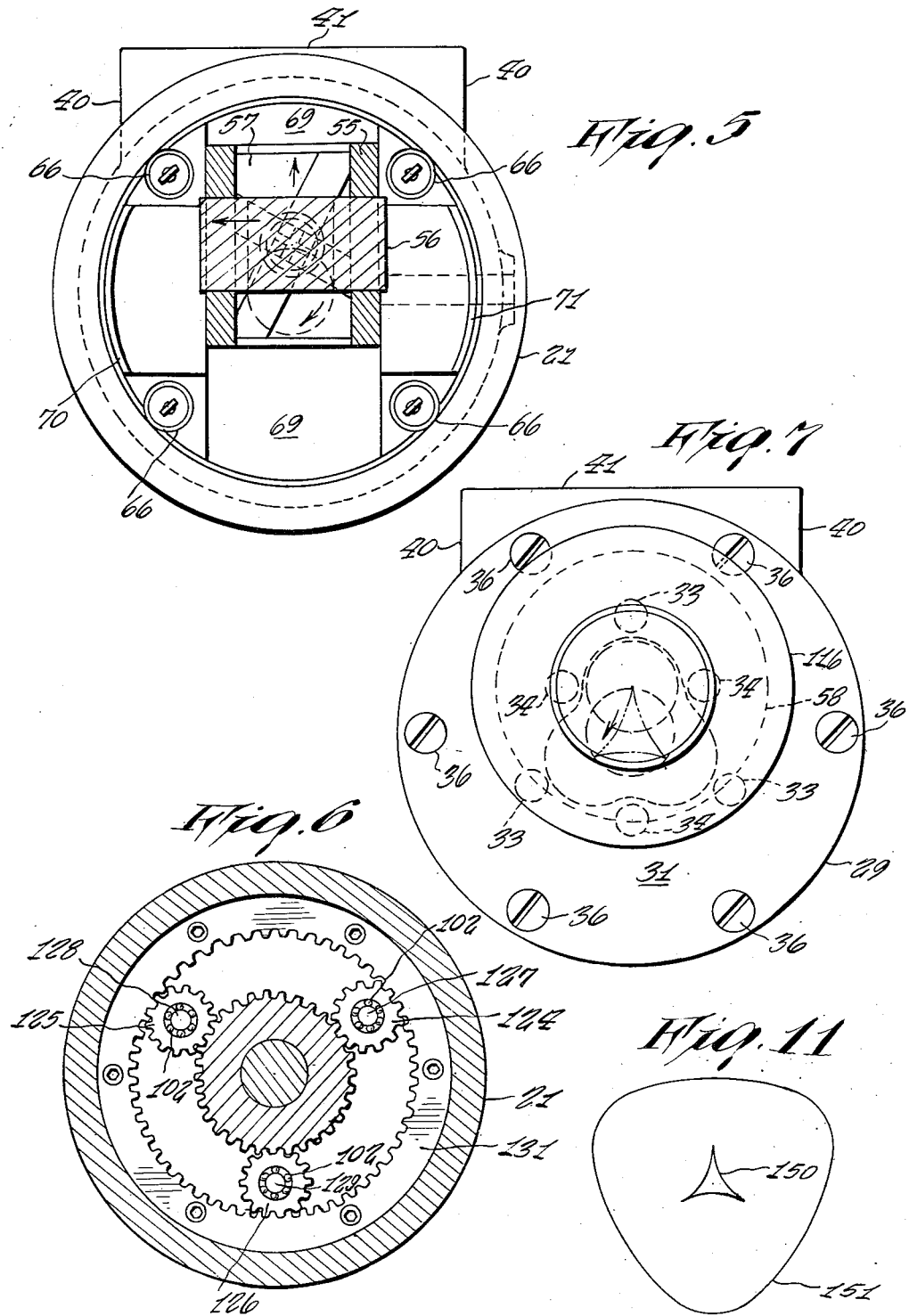

2,762,250
MACHINING TOOL
Reiner J. Auman, Brooklyn, and Alfred Meyerhoff, Queens, N. Y.

Application September 8, 1953, Serial No. 378,951

6 Claims. (Cl. 82—18)

This invention relates generally to the machine tool art, and more particularly to an improved device for use in machining objects having a non-circular configuration.

In recent years, it has been found necessary in certain fields to machine parts having outer surfaces or bores which are cycloidal in cross sectional shape. These shapes cannot be machined by ordinary lathes and other machine tools having rotationally driven moving parts, and heretofore, such parts have been machined either upon special tools costing many tens of thousands of dollars, or by hand, which has been not only costly, but inaccurate. Often, such shapes have been cut by following profiles which guide the tool in a predetermined path to achieve the desired result. The accuracy of such machine depends upon the accuracy of the profile, and how rigidly the profile is held against the tool. Such machining has also proved to be very difficult, and not very accurate.

It is therefore among the principal objects of the present invention to provide a machine tool or attachment therefor, which is capable of machining intricate geometric patterns or shapes, while yet avoiding all of the above-enumerated difficulties and disadvantages.

Another object of the invention lies in the provision of a machine tool of the class described in which the cutting paths of motion are generated rather than determined by fixed profiles.

Another object of the invention lies in the provision of a machine tool capable of generating non-circular cutting paths of motion in which the cost of fabrication may be of a relatively low order, with consequent wide sale, distribution and use.

A further object of the invention lies in the provision of a machine tool of the class described which is particularly adapted to the generating and cutting of hypocycloidal shapes.

A feature of the invention lies in the fact that the device embodies a minimum of moving parts as contrasted with prior art devices in which the number of parts often exceeded several hundred.

Another feature of the invention lies in the relative compactness of the device as contrasted with more cumbersome machines known in the prior art.

Another object of the invention lies in the provision of a device which may be attached to and made a part of an existing machine tool so that the tool may be used in the machining of non-circular shapes. The present invention contemplates the provision of a device which may be adapted to many types of existing machine tools having a rotatably driven power output means.

A further object of the invention lies in the provision of a device of the class described which may be conveniently assembled or disassembled for servicing, as required, and which will require a minimum of servicing throughout a relatively long useful life.

A feature of the invention lies in the fact that the device permits of non-circular machining in which the work is maintained in stationary position, thereby permitting the device to be used with such tools as drill presses, milling machines and the like.

These objects and features, as well as other incidental ends and advantages, will become more clearly apparent during the course of the following disclosure, and be pointed out in the appended claims.

On the drawings, to which reference will be made in the specification, similar reference characters have been employed to designate corresponding parts throughout the several views.

Figure 1 is a fragmentary sectional view showing an embodiment of the device.

Figure 2 is an end view in elevation, partly broken away in section, to show interior detail.

Figure 3 is a fragmentary vertical sectional view as seen from the plane 3—3 on Figure 1.

Figure 4 is an end view in elevation as seen from the left-hand portion of Figure 3.

Figure 5 is a vertical transverse sectional view as seen from the plane 5—5 on Figure 1.

Figure 6 is a vertical transverse sectional view as seen from the plane 6—6 on Figure 1.

Figure 7 is a view in elevation as seen from the left-hand end of Figure 1.

Figure 8a is an exploded view in perspective, partly in section, showing the component parts of a first motion generating element which comprises a part of the device.

Figure 8b is an exploded view in perspective showing the component parts of a second motion generating element which comprises a part of the device.

Figure 9 is a view in perspective showing one of the component parts shown on Figure 8a.

Figure 10 is a view in perspective showing another of the parts disclosed on Figure 8a.

Figure 11 is a schematic view showing examples of types of motion which may be generated by employing the inventive structure.

In accordance with the invention, the device, generally indicated by reference character 15, comprises broadly: an outer casing element 16, motion input means 17, a first motion generating element 18, a second motion generating element 19 and a motion output means 20.

Referring to Figure 1, the outer casing element 16 includes a cup-shaped member 21, which houses the first and second motion generating elements 18 and 19, a thrust bearing member 22, a quasi tubular member 23, and a support or mounting member 24.

The cup-shaped member 21 is bounded by an outer surface 25, as well as an inner surface 26. Suitable oil holes or channels 27 are provided in the same to allow for the introduction of lubricant (not shown) as required. The cup-shaped member 21 is provided with a plurality of threaded holes 28 which form means for mounting the member 22 thereupon when the device is assembled.

Referring to Figures 1 and 8a, the thrust bearing member 22 is of generally circular configuration, being bounded by an outer peripheral edge 29, an inner surface 30, an outer surface 31, and an irregularly shaped centrally disposed opening 32. A plurality of ball bearings 33 are disposed on the outer surface 31, and a similar set of roller bearings 34 are disposed on the inner surface 30. Screw holes 35 correspond to the threaded holes 28 on the cup-shaped member 21, and the member 22 is maintained upon the member 21 by means of suitable screws 36.

The tubular member 23 is preferably formed integrally with the cup-shaped member 21, and includes a seat 37 for a ball bearing race on the inner surface 39. The outer surface 38 thereof is preferably continuous with the surface 25.

The support member 24 provides means for securing the outer casing element 16 to a fixed surface (not shown), to prevent rotation during operation of the device. It includes a pair of side walls 40, as well as a mounting surface 41, which is adapted to be positioned flush upon the fixed surface.

The motion input means includes a stub shaft 42 mounted for rotation upon a set of ball bearings 43. The shaft 42 is integral with a tubular member 44, which member includes an outer surface 45 having openings 46 and 47 extending radially therein and a gear 48. The inner end surface 49 is provided with dovetail members 50 and a bore 51 extends axially therefrom.

The first motion generating element 18 comprises an inner rotating housing 52, an eccentric adjusting member 53, a rotating driving member 54, a first reciprocating member 55, a second reciprocating member 56, a third reciprocating member 57, and a reciprocating thrust member 58.

The housing 52 includes an outer planar surface 59, an outer cylindrical surface 60, a central bore 61, a counter bore 62, a plurality of circularly shaped recesses 63, and cut away portions 64. A plurality of bores 65 interconnect the portions 64 with the recesses 63, and provide means for mounting the bearing members 66, which ride upon the inner surface 26 of the outer casing element 16.

A large channel 67 is formed by the side surfaces, one of which is indicated by reference character 68, and a bottom surface 69. A pair of curved walls 70 and 71 form recesses 72 and 73, the purpose of which will become more clearly apparent at a point later in the disclosure.

The eccentric adjusting member 53 comprises a first shaft member 74 having a geared portion 75 and a second shaft member 76 which forms a bearing. The outer end surface 77 has mounted thereupon an eccentrically disposed adjusting pin or projection 78.

The driving member 54, as may be seen on Figure 8a, includes a base member 74 having dovetailed edges 80, as well as rounded end edges 81. The inwardly disposed surface 82 is provided with a groove 83 which engages the pin 78 when the device is assembled. The outwardly disposed surface 84 is provided with a second relatively larger pin 85.

The first reciprocating member 55 includes an inwardly disposed surface 86, side surfaces 87, and end surfaces 88. An elongated slot 89 extends substantially the entire width of the member, the slot 89 providing clearance for the pin 85. A first channel 90 is defined by a bottom surface 91 and side surfaces 92, the axis of the channel 90 extending at right angles to that of the slot 89. A second channel 93 is defined by the bottom surface 94, and side surfaces 95, this channel lying parallel to the slot 89. The outer surfaces 96 are positioned so as to clear the member 58, as may be seen on Figure 1.

The second reciprocating member 56 is bounded by side surfaces 98, end surfaces 99, a rear surface 100 and a front surface 103. A circular bore 101 is provided with a needle bearing 102, the bearing being engaged by a portion of the pin 85 (see Figure 1). On the front surface 103 there is disposed a diagonally positioned cam member 104 which is adapted to engage the member 57.

The third reciprocating member 57 includes a rear surface 105, side surfaces 106, and end surfaces 107. A diagonally disposed channel 108 is adapted to engage the member 104, and on the front surface 109 there is disposed a second diagonal cam member 110, the axis of which lies at substantially right angles to that of the channel 108 and cam member 104.

The reciprocating thrust member 58 includes a main body portion 111 and a guide portion 112. A channel 113 (see Figure 9) extends across the guide portion 112, the same being engageable with the cam member 110 when the device is assembled. The guide portion 112 is also supported upon the first reciprocating member for relative sliding motion parallel to member 56. Extending in an opposite direction from the main body portion 111, is a stub shaft 114, having a threaded end 115. A tool holder 116 is maintained upon the shaft 114 by a threaded unit 117. The tool holder 116 is provided with a bore 118 to provide means for engaging a cutting tool 116a.

Referring again to the eccentric member 53, on Figure 8b, it will be observed that the geared portion 75 is engageable with a worm shaft 119 having a worm 121 thereupon. A knurled grip 120 permits the shaft 119 to be rotated, which rotation results in altering the relative position between the pin 78 and the driving member 54. When a desired adjustment is reached, the set screw 122 may be tightened upon the shaft member 74 through the locking collar 123, to maintain the adjustment throughout extended operation.

The second motion generating element 19 is adapted to rotate separate parts comprising the first motion generating element 18 at different relative angular velocities with respect to the outer casing element 16. The element includes a plurality of planetary gears 124, 125 and 126 which are supported upon the inner housing 52 by means of pins 127, 128 and 129, respectively. The gears 124 to 126 are engageable with the internally toothed ring gear 131 which is fixed with respect to the outer casing element in the recess 132. The gear 48 acts as a sun gear, and the gear ratio shown as three to one may be varied as required.

Operation

The operation of the device is as follows: Before starting the cutting operation, the set screw 122 is loosened to permit the knurled knob 120 to be rotated whereby the eccentrically disposed pin 78 is moved to determine the location of the pin 85 with respect to the axis of rotation of the stub shaft 42. This adjustment determines the effective nominal diameter of the geometric figure to be generated. The set screw 122 is then tightened, after which the shaft 42 is rotated in either direction. Power is transmitted through the dovetail 50 to result in the pin 85 describing pure orbital motion with respect to the axis of the shaft 42. As the pin 85 moves, it slides from side to side in the slot 89, and being engaged in the bore 101 causes the second reciprocating member 56 to oscillate within the channel 93 in a direction perpendicular to the direction of oscillation of the member 55. The cam member 104 on the member 56 being engaged with the channel 108 in the member 57 causes the same to oscillate within the channel 90 in a direction parallel to that of the slot 67. The member 58 normally oscillates in the channel 93, and is driven by the member 57 through the engagement of the cam member 110 with the channel 113. From a consideration of Figures 1 and 8a, it will be apparent that the element 18, by itself, upon rotation, will generate an ellipse, the major axis of which is determined by the distance between the center of the pin 85 and the axis of rotation of the stub shaft 42, and the minor axis of which is determined by the degree of oscillation of the member 58 within the first channel 93.

To the above-described motion, there is now added a rotational component caused by rotating the housing 52 at an angular velocity less than that of the shaft 42, this rotation being supplied by the above-described gearing mechanism which comprises a part of the second motion generating element 19. The effect of such superimposition is to cause the shaft 114 to describe a three-cusp hypocycloid 150 as shown on Figure 11. By varying the gear ratio between gears 124, 125, 126 and the gear 48, and by varying the angles of engagement between members 104 and 110, with respect to the axis of the channel 90, hypocycloids of greater or lesser numbers of lobes may also be generated. In each case the number of lobes required determines the ratio of the major axis to the minor axis of the generated cycloid.

Since the tool holder 116a and tool are mounted eccentrically with respect to the shaft 114, as the shaft 114 is rotated, the tool will describe the normal extensions of a hypocycloid, as indicated at 151 on Figure 11. By arranging the cutting edge of the tool to coincide in the axis of the shaft 114, it is possible to cut a hypocyloidal shape as well as the normal extensions of the figure.

It may thus be seen that we have invented novel and highly useful improvements in cutter devices in which there has been provided a means for cutting other than circular configurations upon machined pieces of work. The device is relatively simple in construction, and owing to the fact that the motions involved are generated, rather than guided, the cutting operation is far more accurate than has heretofore been possible. The device is relatively trouble free in operation, and may be manufactured at a relatively low cost. Modifications of the basic mechanical linkage system employed may be incorporated into a large number of different types of machine tools with equally effective results, and the device may be manufactured using production techniques already known in the art. By varying the location and orientation of the cutting tool with respect to the motion output means in conjunction with the adjustment of the degree of eccentricity of the driving member, it is possible not only to generate a given family of normal extensions of a hypocycloid which are generally similar, but to vary the actual shape of a hypocycloid of given size, and to generate an entire family of curves which are similar for each given shape of hypocycloid. When desired, the device may be used in conjunction with machine tools which normally rotate the workpiece, by eliminating the second path generating element, and driving the first path generating element at the same speed as the work.

We wish it to be understood that we do not consider the invention limited to the exact details of structure shown and set forth in this specification, for obvious modifications will occur to those skilled in the art to which the present invention pertains.

We claim:

1. A device for generating cycloid motion comprising: a first motion generating element, and a second motion generating element; said first motion generating element including a rotating member having an eccentric, a first reciprocating member, a second reciprocating member supported by said first reciprocating member and engaging said eccentric; said second reciprocating member reciprocably driving said first reciprocating members; a third reciprocating member supported by said first reciprocating member and driven by said second reciprocating member; a fourth reciprocating member supported by said first reciprocating member, and driven by said third reciprocating member; said first generating element when rotated serving to generate an eliptical path of motion; said second motion generating element having means for rotating said first motion generating element as the same generates an elliptical path of motion.

2. A device for generating cycloidal motion comprising: a first motion generating element, and a second motion generating element; said first motion generating element including a rotating member having an eccentric, a first reciprocating member engaging said eccentric, a second reciprocating member supported by said first reciprocating member and engaging said eccentric, a third reciprocating member supported by said first reciprocating member and driven by said second reciprocating member; a fourth reciprocating member supported by said first reciprocating member, and driven by said third reciprocating member; said first generating element when rotated serving to generate an elliptical path of motion; said second motion generating element including a housing, a gear reduction means interconnecting said first motion generating element and said housing; and means for rotating said first motion generating element.

3. A device for machining objects to hypocycloidal shapes comprising: a casing element, motion input means, a first motion generating element, a second motion generating element, motion output means, and tool holding means; said motion input means being adapted to transmit pure rotational motion to said first and second motion generating element; said first motion generating element including an eccentrically disposed pin driven by said motion input means, a rotating housing disposed interiorly of said casing element, a first reciprocating member slidably mounted upon said housing, a second reciprocating member slidably mounted upon said first reciprocating member, said eccentrically disposed pin projecting through said first reciprocating member in an elongated slot therein and engaging said second reciprocating member in a bore therein; said second reciprocating member reciprocably driving said first reciprocating member; a third reciprocating member slidably mounted upon said first reciprocating member for movement at substantially right angles with respect to said second reciprocating member, and means slidably interconnecting said second and third reciprocating members for the transmission of motion therethrough; a fourth reciprocating member supported by said first reciprocating member, and driven by said third reciprocating member; said motion output means being connected to said fourth reciprocating member; said second motion generating element including means for rotationally driving said housing through a smaller angular displacement as said motion input means is rotated through a given angular displacement.

4. A device for machining objects to hypocycloidal shapes comprising: a casing element, motion input means, a first motion generating element, a second motion generating element, motion output means, and tool holding means; said motion input means being adapted to transmit pure rotational motion to said first and second motion generating element; said first motion generating element including an eccentrically disposed pin driven by said motion input means; a rotating housing disposed interiorly of said casing element, a first reciprocating member slidably mounted upon said housing, a second reciprocating member slidably mounted upon said first reciprocating member, said eccentrically disposed pin projecting through said first reciprocating member in an elongated slot therein and driving said second reciprocating member in a bore therein, a third reciprocating member slidably mounted upon said first reciprocating member for movement at substantially right angles with respect to second reciprocating member, and means slidably interconnecting said second and third reciprocating members for the transmission of motion therethrough; a fourth reciprocating member supported by said first reciprocating member, and driven by said third reciprocating member; said motion output means being connected to said fourth reciprocating member; said second motion generating element including planetary gear means interconnecting said housing and said motion input means for rotating said housing at a lower angular velocity than that of said motion input means upon imparting motion to said motion input means.

5. A device for machining objects to hypocycloidal shapes comprising: a casing element, motion input means, a first motion generating element, a second motion generating element, motion output means, and tool holding means; said motion input means being adapted to transmit pure rotational motion to said first and second motion generating element; said first motion generating element including an eccentrically disposed pin driven by said motion input means, a rotating housing disposed interiorly of said casing element, a first reciprocating member slidably mounted upon said housing, a second reciprocating member slidably mounted upon said first reciprocating member, said eccentrically disposed pin passing through said first reciprocating member in an elongated slot therein and having said second reciprocating member in a bore therein, a third reciprocating member slidably mounted upon said first reciprocating member for movement at substantially right angles with respect to said second reciprocating member, and means slidably interconnecting said second and third reciprocating members for the transmission of motion therethrough; a fourth reciprocating member supported by said first reciprocating member, and driven by said third reciprocating member; said motion output means being connected to said fourth reciprocating member; said second motion generating element including an internally toothed ring gear mounted upon the inner surface of said outer casing element; a planetary gear mounted upon said housing, and a sun gear concentric with said motion input means; whereupon imparting motion to said motion input means said housing will rotate in the same direction at a reduced angular velocity.

6. A device for machining objects to hypocycloidal shapes comprising: motion input means, a motion generating element, motion output means and tool holding means; said motion input means being adapted to transmit pure rotational motion to said motion generating element; said motion generating element including an eccentrically disposed pin driven by said motion input means, a first reciprocating member; a second reciprocating member slidably mounted upon said first reciprocating member, said eccentrically disposed pin engaging said second reciprocating member in a bore therein; a third reciprocating member slidably mounted upon said first reciprocating member for movement at substantially right angles with respect to said second reciprocating member, and means slidably interconnecting said second and third reciprocating members, for the transmission of motion therethrough; a fourth reciprocating member slidably mounted for reciprocation on said first reciprocation member; said motion output means being driven by said fourth reciprocating member.

References Cited in the file of this patent

UNITED STATES PATENTS

| | | |
|---|---|---|
| 929,789 | Rockenhauser | Aug. 3, 1909 |
| 1,755,349 | Casse | Apr. 22, 1930 |
| 2,267,250 | Mossdorf | Dec. 23, 1941 |
| 2,486,977 | Peters | Nov. 1, 1949 |
| 2,592,875 | Durland | Apr. 15, 1952 |

FOREIGN PATENTS

| | | |
|---|---|---|
| 4,874 | France | Feb. 8, 1836 |